United States Patent [19]

Willems et al.

[11] 4,438,083

[45] Mar. 20, 1984

[54] PROCESS FOR PREPARING MAGNESIUM NITRATE HEXAHYDRATE AND FOR THERMALLY STABILIZING AMMONIUM NITRATE USING MAGNESIUM NITRATE HEXAHYDRATE

[75] Inventors: Michael H. Willems; Winfried J. W. Vermijs, both of Geleen, Netherlands

[73] Assignee: Stamicarbon B.V., Geleen, Netherlands

[21] Appl. No.: 418,547

[22] Filed: Sep. 15, 1982

[30] Foreign Application Priority Data

Sep. 17, 1981 [NL] Netherlands ......................... 8104284

[51] Int. Cl.$^3$ ............................................ C01F 11/14
[52] U.S. Cl. .................................... 423/266; 423/395; 423/396
[58] Field of Search ........................ 423/395, 266, 396

[56] References Cited

U.S. PATENT DOCUMENTS 1,844,862 2/1932 Mohler ................................ 423/395
1,865,303 6/1932 Charrier ............................. 423/395

FOREIGN PATENT DOCUMENTS 534723 12/1956 Canada ................................ 423/395
289370 4/1928 United Kingdom ................ 423/395
300632 8/1929 United Kingdom ................ 423/395
500830 2/1939 United Kingdom ................ 423/395
355101 11/1972 U.S.S.R. ............................. 423/395

Primary Examiner—Edward J. Meros
Assistant Examiner—Wayne A. Langel

[57] ABSTRACT

Process for preparing magnesium nitrate hexahydrate without the need for filtering aids. A process for preparing magnesium nitrate hexahydrate essentially comprises: (a) forming a magnesium oxide or magnesium carbonate suspension in melted magnesium nitrate hexahydrate at a suspension temperature in excess of 90° C.; (b) adding a nitric acid solution to the suspension while stirring thereby forming a reaction mixture containing additional magnesium nitrate hexahydrate; (c) filtering the liquid reaction mixture to obtain a clear magnesium nitrate hexahydrate filtrate; (d) discharging as product a part, corresponding to the amount of magnesium oxide or magnesium carbonate introduced, of the liquid magnesium nitrate hexahydrate obtained as clear filtrate; (e) utilizing the remaining part as liquid medium for the conversion of magnesium oxide or magnesium carbonate with nitric acid. Thermally stabilized ammonium nitrate containing granules may also be prepared containing magnesium nitrate hexahydrate according to the above process.

9 Claims, No Drawings

PROCESS FOR PREPARING MAGNESIUM NITRATE HEXAHYDRATE AND FOR THERMALLY STABILIZING AMMONIUM NITRATE USING MAGNESIUM NITRATE HEXAHYDRATE

BACKGROUND OF THE INVENTION

The invention relates to a process for preparing magnesium nitrate hexahydrate by reacting magnesium oxide or magnesium carbonate with nitric acid in the presence of water. The invention also relates to a process for preparing thermally stable ammonium nitrate containing granules using the magnesium nitrate hexahydrate obtained by converting magnesium oxide or magnesium carbonate with nitric acid in the presence of water.

A process for preparing magnesium nitrate hexahydrate starting from magnesium oxide, nitric acid and water is known from U.S. Pat. No. 1,844,862. According to this known process, finely divided magnesium oxide is added to dilute nitric acid while stirring, the amount added being sufficient for complete conversion, after which the mixture is allowed to settle, the solid matter is filtered off, the remaining solution is evaporated and finally magnesium nitrate hexahydrate is crystallized out by cooling. As the magnesium oxide is added, the mixture is cooled to maintain a temperature of 71° C. until almost all of the magnesium oxide is added. Subsequently the temperature is raised at the end of the reaction period to facilitate neutralization of the reaction mixture.

A disadvantage of this known process is that a large proportion of the impurities introduced with the magnesium oxide go into solution. Subsequently after cooling the impurities crystallize out to a large extent along with the magnesium nitrate hexahydrate thereby yielding an impure product. This impure product is not easily filtered. The filtering difficulties necessitate the use of filtering aids.

Another disadvantage of this process is that in its practical realization, that is in commercial production processes, the excess of water which is always introduced must subsequently be removed through evaporation.

Using this product in preparing thermally stable ammonium nitrate granules causes additional problems such as severe fouling of the evaporators in the ammonium nitrate plant. If a prilling technique is employed, this impure prior art product clogs the spray openings of the prilling bucket.

The present invention provides a process in which the above-mentioned disadvantages do not or hardly occur. It is therefore the object of the present invention to provide a method for the preparation of a magnesium nitrate hexahydrate by converting magnesium oxide or magnesium carbonate with nitric acid in the presence of water whereby the resultant product is purer than that obtained from the known processes, does not contain excess water, does not foul evaporators in ammonium nitrate plants, and does not clog prilling process equipment.

DETAILED DESCRIPTION OF THE INVENTION

The process of the present invention for preparing magnesium nitrate hexahydrate and thermally stabilizing ammonium nitrate with the thus obtained magnesium nitrate hexahydrate without the need for filtering aids essentially comprises:

(a) forming a magnesium oxide or magnesium carbonate suspension in melted magnesium nitrate hexahydrate at a suspension temperature in excess of 90° C.;

(b) adding a nitric acid solution to the suspension while stirring thereby forming a reaction mixture containing additional newly formed magnesium nitrate hexahydrate;

(c) filtering the liquid reaction mixture to obtain a clear magnesium nitrate hexahydrate filtrate;

(d) discharging as product a part of the liquid magnesium nitrate hexahydrate obtained as clear filtrate, which product fraction corresponds to the amount of magnesium oxide or magnesium carbonate introduced to the melt;

(e) utilizing the remaining non-product part or fraction as the liquid medium for the further conversion of magnesium oxide or magnesium carbonate with nitric acid.

In the process according to the present invention, both a chemically pure and a commercially available technical-grade magnesium oxide may be used. For instance technical-grade magnesium oxide may be obtained by calcination of natural magnesite ($MgCO_3$) or of $Mg(OH)_2$, obtained by precipitating magnesium compounds from sea water with dolomite. Technical-grade magnesium oxide contains about 93 weight % to about 96 weight % magnesium oxide. Such a technical-grade magnesium oxide product contains a considerable amount of impurities, particularly iron and aluminium oxides, and possibly silicon dioxide. Advantageously, to obtain a good suspension and subsequently a rapid chemical conversion, the magnesium oxide may be added as finely divided particles or in a powdered form to the magnesium nitrate hexahydrate. By preference, a magnesium oxide product having an average particle size of at most 200 μm, in particular at most 100 μm, and a specific surface area larger than 12 $m^2$/grams is employed.

Although magnesium oxide is preferred, finely divided reactive magnesium carbonate is also suitable.

The amount of added magnesium oxide or magnesium carbonate suspended in the magnesium nitrate hexahydrate may vary within relatively wide limits. However to economically operate the process, it is important to suspend as large a quantity of magnesium oxide or magnesium carbonate as possible in the magnesium nitrate hexahydrate. Naturally, the quantity of suspended magnesium oxide or magnesium carbonate must be less than the maximum permissible quantity of magnesium oxide or magnesium carbonate in view of the suspension viscosity. In general, the quantity of the added magnesium compounds is such that the magnesium oxide or magnesium carbonate concentration of the suspension obtained is about 5 weight % to about 25 weight %.

In order to obtain a homogeneous suspension, there is a further advantage in having the suspension process take place while continuously and intensively stirring.

In the subsequent step, a nitric acid solution is added to the suspension to form a reaction mixture while stirring. The concentration of the nitric acid solution is chosen so that practically all water introduced with the nitric acid and formed during the reaction is bound up as crystallization water in the resulting magnesium nitrate hexahydrate. Theoretically, given the gross reaction equation: $MgO + 2HNO_3 + 5H_2O \rightarrow Mg(NO_3)_2 \cdot 6H_2O$ the amount of water required would correspond to the amount of water in nitric acid having a concentration of about 58.33 weight % $HNO_3$. For practical purposes, a nitric acid having a slightly lower concentration, for instance about 53 weight % to about 58 weight %, is used since during the addition of the acid a portion of the introduced water evaporates due to the strongly exothermic reaction that takes place. In particular, about 55 weight % $HNO_3$ is employed.

The temperature during the acid addition can be selected from within wide limits. However, in the process the lower suspension temperature limit must be at least about 90° C. At lower temperatures impure magnesium nitrate hexahydrate crystallizes out. By preference, the temperature is kept below about 120° C., since at a high temperature the magnesium nitrate hexahydrate decomposes into lower hydrates or basic salts may be formed. In view of the large amount of reaction heat that evolves, it will generally be necessary to cool the mixture during the addition of the acid, however the lower temperature limit must be at least about 90° C.

How the acid is added is of great importance in the subject process. It has been found that, on the one hand, if the pH becomes too low (locally) because too much acid was added, various impurities dissolve and cannot be removed by filtration at a later stage. These impurities include, notably, iron and aluminum oxides. On the other hand, part of the magnesium oxide or magnesium carbonate is not converted if an insufficient amount of acid is added to the suspension.

It has been now found that the filtration of the mixture is favorably affected by the presence of a small amount of non-converted magnesium oxide or magnesium carbonate. By preference, such an amount of nitric acid is used that about 92 weight % to about 98 weight %, in particular about 95 weight %, of the magnesium oxide or magnesium carbonate introduced is converted into magnesium nitrate hexahydrate.

Problems arise if too large an acid addition to the suspension is made. Such problems may be overcome by controlling the addition of nitric acid to the suspension. By preference, a first amount of nitric acid is added to the suspension such that the pH of the resulting mixture is about 6 to about 6.5. The first amount of nitric acid is added at such a rate and while stirring the suspension so intensively that the reactants are homogeneously mixed. A suitable metering rate may be determined by a simple experiment. The pH in the mixture therefore does not locally decrease to below about 4. Subsequently, while stirring, so much additional nitric acid is slowly added until the mixture reaches a pH of about 5.2 to about 5.8. Initially, the pH decreases proportionally with the amount of nitric acid added. This last acid addition is stopped when the pH decrease in the mixture stops or proceeds very slowly.

The liquid mixture obtained after this acid addition is subsequently filtered while carefully maintaining the temperature above about 90° C. It has been found that the mixture has very good filtering properties so that, in contrast with the known processes, the use of special filter aids is superfluous. It has been found that the non-converted magnesium oxide or magnesium carbonate is deposited on the filter forming a layer, analogous to a self-forming second filter, upon which practically all the impurities are deposited. This significantly decreases any impurities in the desired product as contrasted to the known process.

A part of the liquid magnesium nitrate hexahydrate obtained as clear filtrate, is discharged as product. The amount discharged corresponds to the amount of magnesium oxide or magnesium carbonate originally introduced. The remaining portion of the magnesium nitrate hexahydrate is re-used and recycled as the liquid medium to be employed in the conversion of magnesium oxide or magnesium carbonate with nitric acid.

In principle, the thus obtained liquid magnesium nitrate hexahydrate product can be put to a variety of end uses. For instance, it may be used as such or, after mixing with fertilizer components, as liquid fertilizer. The product is also suitable for conversion, without further pretreatment, into, for instance, lower hydrates.

The product is preeminently suitable for stabilizing ammonium nitrate-containing granules against thermal crystal modifications. A small amount of the liquid magnesium nitrate hexahydrate obtained according to the present process is added to an ammonium nitrate-containing solution or melt. Subsequently, the thus obtained mixture is granulated in a known way. Optionally, the granulation may be after evaporation. Suitable known granulation methods are described in, for instance, U.S. Pat. Nos. 2,402,192, 2,926,079, 3,232,703, 4,008,064, 4,213,924 and 4,316,736 the disclosures of which are hereby incorporated by reference.

The amount of the magnesium nitrate hexahydrate stabilizer added may vary. In general, about 0.1 weight % to about 1 weight %, in particular about 0.5 weight %, is added. The weight percent is calculated on the basis of magnesium oxide relative to the amount by weight of ammonium nitrate.

It has been found that the water content of the final product obtained must be less than 0.5 weight %.

This can be achieved in a known way, for instance by evaporation of the liquid mixture to be granulated or by drying the granular product.

The thermal stabilization of ammonium nitrate using magnesium nitrate (hydrates) is known from, for instance, British Pat. Nos. 914,606 and 988,095. These known processes utilize water-free magnesium nitrate or lower hydrates, often in solution, or employ a magnesium nitrate hydrate prepared in a process that is different from the present invention. Magnesium nitrate hydrate prepared according to these other processes is not free from the problems plagueing the other known hydrate products prepared according to, for instance, U.S. Pat. No. 1,844,862.

The present invention will now be illustrated in the following non-limiting examples, wherein in place of the magnesium oxide illustrated, magnesium carbonate may be employed instead.

EXAMPLE 1

To 600 grams melted $Mg(NO_3)_2 \cdot 6H_2O$ having a temperature of 95° C., 100 grams magnesium oxide was added. The mixture was stirred for 15 minutes to form the MgO-containing suspension. A technical-grade magnesium oxide product having an average particle size of <75 μm and a specific surface of about 50 m²/grams which contained 2000 ppm $Fe_2O_3$, 1800 ppm $Al_2O_3$, 8000 ppm $SiO_2$ and 1.3 weight % CaO was used.

While stirring intensively, a 55 weight % $HNO_3$ solution was added to the suspension. The metering rate was such that after 1 hour the pH of the mixture was 6.0. The temperature was kept at about 105° C. while the acid was being added.

Subsequently, while stirring the mixture, an amount of 55 weight % HNO$_3$ was very slowly added to the mixture, such that after another hour the pH of the mixture was 5.4. The temperature was kept at about 95° C. The thus obtained liquid reaction mixture was filtered yielding 1175 grams of a clear filtrate comprised of liquid Mg(NO$_3$)$_2$.6H$_2$O having a crystallization temperature of 88° C. This liquid filtrate contained <1 ppm Fe$_2$O$_3$, only about 2 ppm Al$_2$O$_3$ and only 1 ppm SiO$_2$. 575 grams were discharged as a product fraction from the filtrate. The remaining 600 grams of the filtrate was utilized as the liquid medium in another conversion of MgO with HNO$_3$.

EXAMPLE 2

To an NH$_4$NO$_3$ solution containing 4 weight % water 2.9 weight % of Mg(NO$_3$)$_2$.6H$_2$O, obtained according to Example 1, was added. The liquid mixture, with a temperature of about 160° C., was sprayed sideways into a circular bed (temp. 135° C.) of fluidized NH$_4$NO$_3$ nuclei (average diameter 2.7 mm, bed height 40 cm) by means of a powerful air stream via a two-phase sprayer to form granules. Via an overflow the thus formed granules formed were discharged to a sieve, and separated into a fine fraction (<2 mm), a product fraction (about 2 to about 4 mm) and a coarse fraction (>4 mm). The product fraction, which contained 0.2 weight % H$_2$O and 0.5 weight % MgO, was rapidly cooled to about 35° C. in a fluidized bed and subsequently heated and cooled five times between 15° C. and 50° C. After five cycles, the product exhibited practically no reduction in crushing strength (about 45 bar) and shared only a very slight increase in volume (<2%).

EXAMPLE 3

A mixture of 97 parts by weight of a 96 weight % NH$_4$NO$_3$ solution and 3 parts by weight of Mg(NO$_3$)$_2$.6H$_2$O (obtained according to the process of Example 1) was evaporated to a water content of 0.2 weight %. Subsequently the thus partially dried mixture was sprayed in a prilling tower in counterflow with a cool air stream. The prills obtained were cooled to about 45° C. in a fluidized bed and subsequently subjected to five heating and cooling cycles between 15° C. and 50° C. as described in Example 2. The product showed no deterioration in crushing strength and hardly any increase in volume.

While the invention has been described in connection with what is presently considered to be the most practical and preferred embodiments, it is to be understood that the invention is not to be limited to the disclosed embodiments but on the contrary, is intended to cover various modifications and equivalent processes included within the spirit and scope of the appended claims, which scope is to be accorded the broadest interpretation so as to encompass all such modifications and equivalent processes.

We claim:

1. Process for preparing pure magnesium hexahydrate suitable as a stabilizer for thermally stable ammonium nitrate granules by reacting magnesium oxide or magnesium carbonate with nitric acid in the presence of water, comprising the combination of steps of:
   (a) forming a suspension of magnesium oxide or magnesium carbonate in melted magnesium nitrate hexahydrate at a suspension temperature in excess of 90° C. up to about 120° C.;
   (b) adding a nitric acid solution to said suspension at a temperature in excess of about 90° C. and up to about 120° C. while stirring said suspension to obtain a liquid reaction mixture, whereby additional magnesium nitrate hexahydrate is formed in said mixture, said nitric acid solution having a concentration of about 53 weight percent to about 58 weight percent acid;
   (c) filtering said liquid reaction mixture at a temperature in excess of about 90° C. and up to about 120° C. to obtain a clear magnesium nitrate hexahydrate filtrate; and
   (d) discharging as a product fraction a quantity of said clear filtrate approximately corresponding to the amount of magnesium oxide or magnesium carbonate introduced in step (a).

2. Process according to claim 1, wherein said process further comprises recycling the non-product fraction from step (d) as the liquid medium for converting magnesium oxide or magnesium carbonate with nitric acid to magnesium nitrate hexahydrate.

3. Process according to any one of claims 1 or 2, wherein technical-grade magnesium oxide having an average particle size of at most 200 μm is used.

4. Process according to claim 1 or 2, wherein about 5 weight % to about 25 weight % magnesium oxide is suspended in said melted magnesium nitrate hexahydrate.

5. Process according to claim 1 or 2, wherein said magnesium oxide has an average particle size of at most 100 μm and a specific surface larger than 12 m$^2$/grams.

6. Process according to claim 1 or 2, wherein step (b) an amount of a nitric acid solution is added to the suspension such that 92 weight % to 98 weight % of the magnesium oxide or magnesium carbonate is converted into magnesium nitrate hexahydrate.

7. Process according to claim 1, wherein step (b) further comprises:
   (i) adding a first amount of nitric acid to said suspension while intensively stirring the same to obtain a resultant homogeneous reactant mixture having a pH of about 6 to 6.5; and
   (ii) then subsequently slowly adding a second amount of nitric acid to the thusly-acidified mixture until the pH thereof is in the range of about 5.2 to about 5.8.

8. A process for preparing thermally stable ammonium nitrate granules with extremely pure magnesium nitrate hexahydrate comprising the combination of steps of:
   (a) forming a suspension of magnesium or magnesium carbonate in melted magnesium nitrate hexahydrate at a suspension temperature in excess of 90° C. up to about 120° C.;
   (b) adding a nitric acid solution to said suspension at a temperature in excess of about 90° C. and up to about 120° C. while stirring said suspension to obtain a liquid reaction mixture whereby additional magnesium nitrate hexahydrate is formed in said mixture, said nitric acid solution having a concentration of about 53 weight percent to about 58 weight percent acid;
   (c) filtering said liquid reaction mixture at a temperature in excess of about 90° C. and up to about 120° C. to obtain a clear magnesium nitrate hexahydrate filtrate;
   (d) discharging as a pure product fraction a quantity of said clear filtrate approximately corresponding to the amount of magnesium oxide or magnesium carbonate introduced in step (a);

(e) forming a pre-granulation mixture by adding at least a part of said pure product fraction to a solution or melt containing ammonium nitrate; and (f) granulating the thus formed mixture to obtain thermally stabilized ammonium nitrate granules.

9. Process according to claim 8, wherein about 0.1 to about 1 weight percent of the magnesium nitrate hexahydrate product fraction from step (d) is added to solution or melt in step (e).

* * * * *